April 13, 1954   R. K. EVANS ET AL   2,674,988
INTERNAL-COMBUSTION ENGINE
Filed Nov. 10, 1951   2 Sheets-Sheet 2
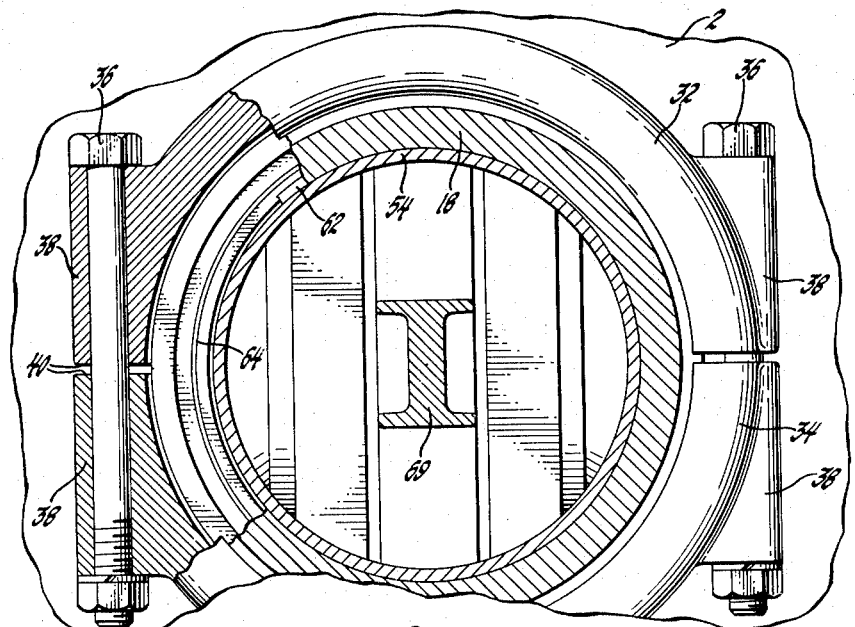
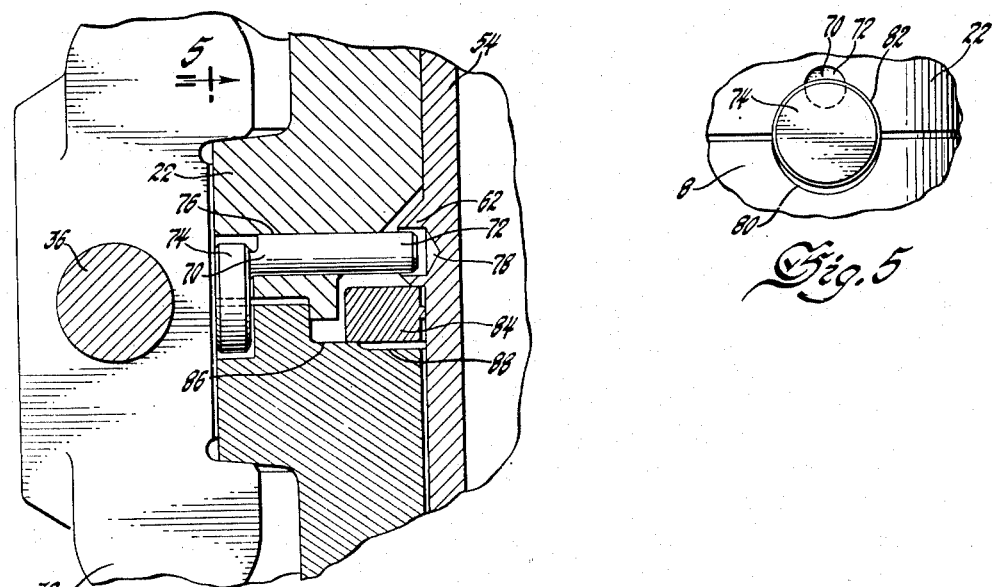
Inventors
ROLAND K. EVANS, AND
WILLIAM H. MANNING, DECEASED
BY MARGARET W. MANNING, ADMINISTRATRIX
Attorneys Patented Apr. 13, 1954

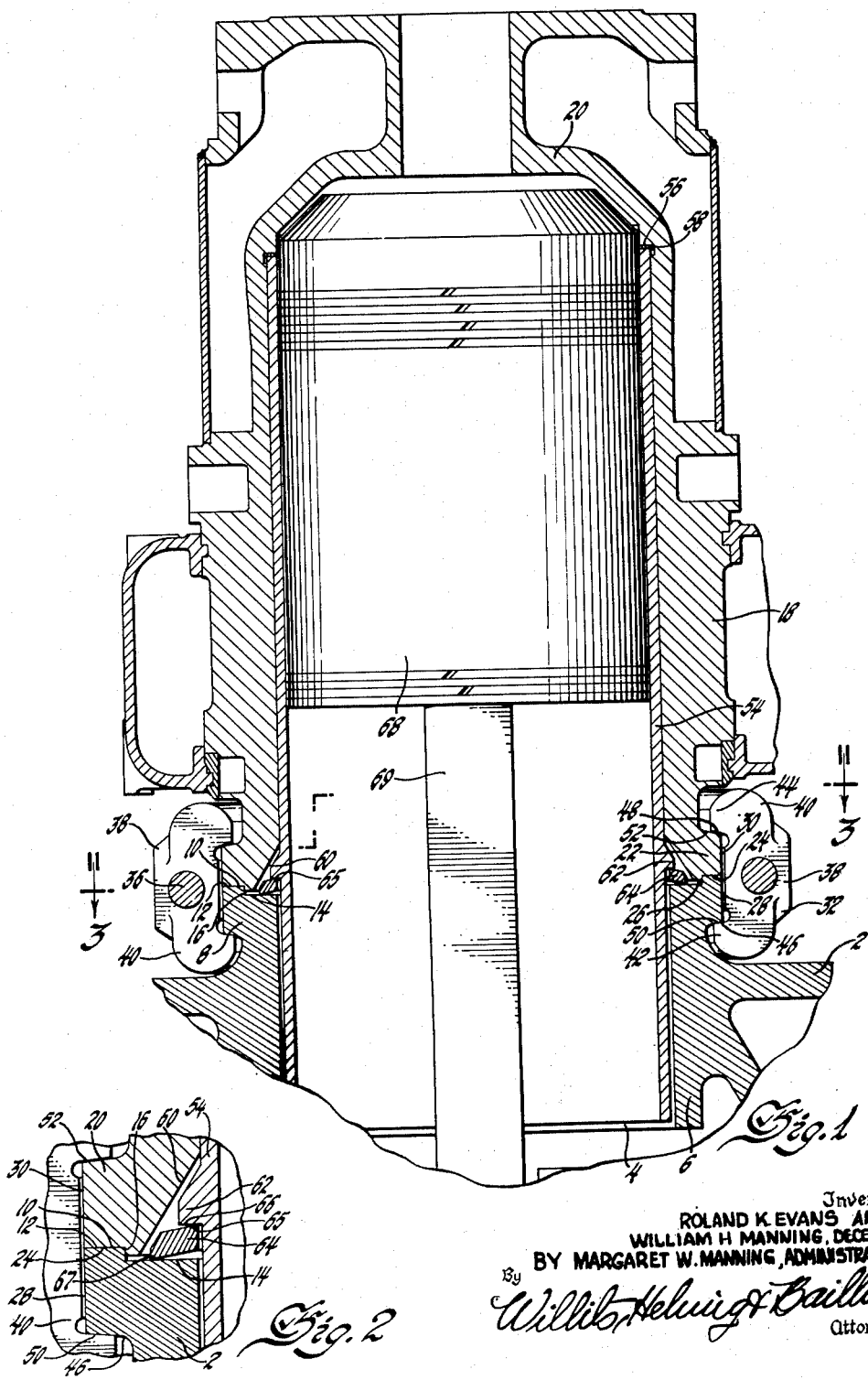

2,674,988

UNITED STATES PATENT OFFICE 2,674,988

INTERNAL-COMBUSTION ENGINE

Ronald K. Evans, Birmingham, Mich., and William H. Manning, deceased, late of Birmingham, Mich., by Margaret W. Manning, administratrix, Birmingham, Mich., assignors to General Motors Corporation, Detroit, Mich., a corporation of Delaware Application November 10, 1951, Serial No. 255,824

6 Claims. (Cl. 123—193)

This invention relates to piston type internal combustion engines and particularly to improvements therein with respect to the mounting of cylinders and cylinder liners to the crankcase.

In conventional engines of this type, particularly those of relatively large size, the cylinders are each provided at their lower ends with an external flange which mates with a cylinder mounting flange formed integral with the crankcase, which flanges are secured together by a ring of bolts or studs and the cylinder liner is separately secured in integral association with the cylinder housing. The disadvantages of such constructions are that the cylinder securing bolts become very highly stressed elements which require great care in obtaining their uniform tightening, adding considerably to the cost of the engine and the time required to install and remove cylinders; and with the liner supported entirely by the cylinder, additional production and assembly costs result where adequate provisions are made to accommodate relative expansion of the cylinder housing and liner.

It is the principal object of this invention to avoid these disadvantages of prior constructions by providing an assembly of crankcase, cylinder, and cylinder liner wherein the liner abuts at one end against the cylinder and rests at its other end on a Belleville type spring supported by the crankcase, and the mating flanges of the cylinder and crankcase are clamped together by peripheral clamping means requiring but two bolts which when tightened effect a wedging action on the flanges securely holding the parts together without undue stressing of the bolts.

Another object and feature of the invention resides in novel means for dowelling and keying the liner to the cylinder and the cylinder to the crankcase, respectively, which means is retained against possible displacement by the aforesaid clamping means.

The manner by which these and other objects of the invention are attained will be clear from the following description, having reference to the drawings, wherein:

Figure 1 is a partial sectional view of an engine incorporating one form of the invention, the section being taken substantially diametrically of an engine cylinder with the piston and connecting rod associated with this cylinder being shown in elevation.

Figure 2 is an enlarged fragmentary view similar to Figure 1 showing the relation of the cylinder, liner, crankcase, and Belleville spring thereof in greater detail.

Figure 3 is a sectional view taken substantially on line 3—3 of Figure 1.

Figure 4 is a further enlarged fragmentary view similar to Figure 2, but showing a preferred arrangement for rotatably locating the cylinder relative to the liner and crankcase, in combination with a modified form of Belleville type spring.

Figure 5 is a sectional view taken substantially on line 5—5 of Figure 4.

Referring now to the drawings and first to Figures 1-3 in particular, the engine crankcase is indicated generally by the numeral 2 and has formed therein a cylinder port 4 terminating inwardly of the crankcase in a skirt portion 6 and outwardly of the crankcase with an externally flanged cylinder mounting boss 8. The outer face 10 of this boss is of stepped configuration, having an upper annular surface portion 12 surrounding a recessed lower surface portion 14, the two surface portions being joined by a vertical shoulder 16. It will be understood that the crankcase 2 may be provided with additional similar cylinder ports 4, the number depending on the number of engine cylinders to be used.

Connected to the crankcase 2 in alignment with the cylinder port 4 is a cylinder or cylinder housing 18 which terminates at its upper end with an integral cylinder head 20 and at its lower end with an externally flanged base 22 having a stepped annular bottom surface 24 the outer portion of which is in mating abutment with the surface portion 12 of the crankcase and the inner and lower depending portion 26 pilots closely on the crankcase shoulder 16 and terminates in slightly spaced relation from the lower surface portion 14 of the crankcase.

The crankcase and cylinder flanges 8 and 22 are turned to substantially the same external diameter as shown at 28 and 30, and encircling these mating flanges is a peripheral clamping means in the form of two half ring members 32 and 34 which are secured together in assembly by a pair of clamping bolts or studs 36. Each of the half ring members 32 and 34 are provided on diametrically opposite ends with integral bosses 38 drilled to receive the bolts 36. The opposing ends 40 of the bosses 38 have a designed minimum spacing between them to prevent their abutment when the bolts 36 are drawn up in assembling the cylinder to the crankcase.

Drawing up the bolts 36 effects a wedging action between each ring member and both the crankcase and cylinder flanges in opposed directions to force the mating surfaces 10 and 12 into tight engagement. This wedging action is provided for by forming the ring members 32 and 34 with a generally C-shaped section as shown in Figure 1, with the legs 42 and 44 of the C having their respective opposite faces 46 and 48 somewhat divergent to each other in the direction inwardly of the cylinder axis and at the proper spacing to closely embrace the lower surface 50 of the crankcase flange 8 and the upper face 52 of the cylinder flange 22, prior to tightening the bolts 36. The legs 42 and 44 of the ring members are of sufficient length to enable the ring members to be thus drawn together a sufficient distance during tightening to effect the desired cylinder-to-crankcase clamping pressure without encountering interference between the ring members and the external circumference of the flanges, or abutment between the ring member bosses 38. Preferably, the crankcase lower flange surface 50 and the cylinder flange surface 52 are likewise made slightly divergent to each other to the same extent as are the ring member faces 46 and 48, thereby distributing the wedging pressure between the flanges and the ring members over a reasonably large area and obtaining a more solid and permanent grip of the ring members on these flanges.

The cylinder liner is indicated at 54 and has its upper end in abutment with the cylinder head portion 20 of the cylinder 18, there being a shoulder 56 provided for this purpose at the upper terminus of the cylinder portion proper. A gasket 58 of copper or other suitable material serves to space the upper end of the liner from the shoulder 56. The inner wall and the depending portion 26 at the lower end of the cylinder is relieved as by the chamfer 60 to provide clearance for an external flange 62 on the liner 54 and the Belleville spring 64. The Belleville spring which is made of spring steel or other hard resilient material has a normally dished configuration as shown and a diameter loosely fitting the periphery of the liner 54 below the liner shoulder 62. Its inner marginal upper edge 65 abuts against the underside 66 of the liner flange 62 and its outer lower edge 67 rests on the recessed surface portion 14 of the crankcase 2. Thus, when the clamping ring members 32 and 34 are installed and tightened, the cylinder 18 in being drawn downwardly against the crankcase forces the liner firmly down against the Belleville spring 64 which serves to resiliently suspend the liner and accommodates relative thermal elongation of the liner and cylinder during engine operation. Reciprocably slidable in the cylinder liner 54 is the usual piston 66 which is connected to the engine crankshaft (not shown) by the connecting rod 68.

While the clamping pressure exerted by the ring members 32 and 34 would normally serve to prevent any rotation of the cylinder 18 about its axis relative to either the liner or the crankcase in operation, we show in Figures 4 and 5 positive means for both thus locating the cylinder relative to the crankcase and locating the liner rotatably in the cylinder. This means is in the form of a generally L-shaped combination key and dowel member 70 having a cylindrical dowel portion 72 forming one leg of the L and an enlarged integral cylindrical key portion 74 which has its longitudinal axis offset from the axis of the dowel portion 72 to form the other leg of the L. The cylinder flange 22 is radially drilled at 76 to receive the dowel portion 72, and the liner flange 62 is provided with a blind hole 78 in its outer periphery to socketably receive the end of the dowel portion 72. Complementary semicircular recesses 80 and 82 are provided in the outer periphery of the crankcase and cylinder flanges 8 and 24 respectively to slidably receive the key portion 74.

While it will be understood that the member 70 is intended for incorporation, if desired, in the construction shown in Figures 1-3 which employs a pre-dished Belleville spring 64, its use in Figures 4 and 5 is shown in conjunction with a slightly different form of Belleville spring 84. The Belleville spring 84 is made substantially flat and operates in similar manner to that of the pre-dished spring 64. To accommodate its deflection under the clamping forces imposed by the ring members 32 and 34 in drawing the liner 54 downwardly in assembly, the recessed lower surface portion 86 of the crankcase is relieved adjacent its inner margin as at 88.

We claim:

1. In a piston type engine, the combination of a crankcase having an outer wall and a cylinder attaching flange spaced from said wall, a cylinder housing having a flange mating with the crankcase flange and a bore terminating at an internal shoulder formed at the upper end of the bore, a liner for said bore having its upper end in abutment with the shoulder and provided with an external flange opposite the cylinder flange, a Belleville spring member spacing said liner flange from the the crankcase flange, and peripheral clamping means encircling the crankcase and cylinder housing and having opposing wedging engagement with the upper and lower faces respectively of the cylinder and crankcase flanges.

2. In an engine having a crankcase and a cylinder removably mounted thereon, mating abutment flanges on the cylinder and crankcase, a pair of semicircular clamping members encircling said flanges and having divergently related wedging surfaces embracing the webs of said flanges, said ring members having their opposing ends in spaced part relation, bolt means interconnecting the opposing ends of said ring members, a dry liner in the cylinder, said cylinder having an integral head portion in abutment with the upper end of the liner, and a resilient annular spring suspending the liner from the crankcase, said spring having an inner-marginal surface portion in abutment with the liner and an outer-marginal surface portion in abutment with the crankcase flange.

3. In a piston type internal combustion engine having a crankcase and a removable cylinder unit, mating abutment surfaces on the cylinder and crankcase, means for clamping said cylinder and crankcase together to maintain said mating surfaces in tight abutment, a cylinder liner, fixed abutment means on the cylinder for the upper end of the liner and resilient abutment means on the crankcase for the opposite end of the liner, and a generally L-shaped member locating the cylinder against rotation about its axis relative to both the liner and the crankcase, said L-shaped member having one leg dowelling the liner to the cylinder and a second leg partially recessed in each of said mating flanges.

4. In an internal combustion engine, a crankcase having an outer wall provided with a cylinder port, a skirt portion formed integral with said wall around said port and terminating at its outer end with an external flange, a cylinder in alignment with said port having a head closing its outer end and an external flange at its inner end in mating abutment with said crankcase flange, said cylinder inner end having an internal chamfer, a cylinder liner having its outer end in abutment with the cylinder head and provided intermediate its ends with an external flange disposed between said chamfer and said crankcase flange, and a dished resilient annular ring encircling the liner and compressed between said liner flange and said crankcase flange when said crankcase and cylinder flanges are in mating engagement.

5. In an internal combustion engine, a crankcase having a cylinder attaching port, a cylinder removably associated with the crankcase and aligned with said port, abutting external flanges of tapered cross section formed on the crankcase and cylinder respectively, a pair of cooperating semi-circular clamp rings of generally inwardly presenting C-section enclosing both said flanges and having the legs of the C in divergent relation to effect a wedging engagement with the tapered cross sections of the flanges when the clamping rings are drawn toward each other, threaded means for interconnecting and drawing together the oppositely disposed ends of the clamp rings, said cylinder having a bore terminating at its upper end with a shoulder, said bore being relieved opposite the crankcase flange by a chamfer, a dry cylinder liner having one end abutting said shoulder and provided with an external flange overlying the crankcase flange below said chamfer, and an annular spring encircling the liner and compressed between said liner flange and said crank case flange when said cylinder flange is drawn into abutment with the crankcase flange.

6. In combination with a crankcase and removable cylinder provided with mating attaching flanges, a removable dry liner within the cylinder, means for clamping the cylinder and crankcase flanges together, an abutment on the internal periphery of the cylinder for the upper end of the liner, an external shoulder on the liner above the crankcase flange, and a Belleville spring resting on the crankcase flange and bearing against said shoulder to hold the liner against said abutment when the cylinder and crankcase flanges are in mating engagement.

References Cited in the file of this patent

UNITED STATES PATENTS

| Number | Name | Date |
|---|---|---|
| 983,409 | Sorensen | Feb. 7, 1911 |
| 1,093,868 | Leighty | Apr. 21, 1914 |
| 1,525,755 | Link | Feb. 10, 1925 |
| 2,203,885 | Wilcken et al. | June 11, 1940 |